United States Patent
Flammer, III et al.

(10) Patent No.: US 9,743,337 B2
(45) Date of Patent: Aug. 22, 2017

(54) MESHED NETWORKING OF ACCESS POINTS IN A UTILITY NETWORK

(75) Inventors: George Flammer, III, Cupertino, CA (US); James Pace, San Francisco, CA (US); Jay Ramasastry, San Jose, CA (US)

(73) Assignee: SILVER SPRING NETWORKS, INC., San Jose, CA (US)

(*) Notice: Subject to any disclaimer, the term of this patent is extended or adjusted under 35 U.S.C. 154(b) by 797 days.

(21) Appl. No.: 12/510,168

(22) Filed: Jul. 27, 2009

(65) Prior Publication Data

US 2010/0074176 A1 Mar. 25, 2010

Related U.S. Application Data

(60) Provisional application No. 61/098,948, filed on Sep. 22, 2008.

(51) Int. Cl.
*H04W 40/22* (2009.01)
*G01D 4/00* (2006.01)
*H04L 12/715* (2013.01)

(52) U.S. Cl.
CPC ............ *H04W 40/22* (2013.01); *G01D 4/004* (2013.01); *H04L 45/04* (2013.01); *Y02B 90/242* (2013.01);
(Continued)

(58) Field of Classification Search
CPC ....... G01D 4/004; H04L 45/04; H04W 40/22; Y04S 20/42; Y04S 20/322; Y02B 90/246; Y02B 90/242
(Continued)

(56) References Cited

U.S. PATENT DOCUMENTS

2005/0259619 A1 11/2005 Boettle et al.
2006/0044158 A1* 3/2006 Womble et al. ......... 340/870.02
(Continued)

FOREIGN PATENT DOCUMENTS

EP 1601136 A1 11/2005
WO WO 2006/119185 A2 11/2006
WO WO 2008/033479 A2 3/2008

OTHER PUBLICATIONS

International Search Report (PCT/ISA/220) issued on Dec. 6, 2010, by European Patent Office as the International Searching Authority for International Application No. PCT/US2009/005152.
(Continued)

*Primary Examiner* — Robert M Morlan
*Assistant Examiner* — Mandish Randhawa
(74) *Attorney, Agent, or Firm* — Buchanan Ingersoll & Rooney PC (57) ABSTRACT

A meshed networking of access points in a utility network provides a more efficient and cost effective arrangement for communicating data between meters and the utility by linking the access points of multiple subnetworks for purposes of communicating with the utility. As a result, each individual subnetwork is not required to directly communicate with the utility. For those access points that are relieved of the need to directly communicate with the utility, the communication mechanism, e.g., cellular modem, can be eliminated, or deactivated, to thereby reduce capital expenditures and/or operational costs. Additionally, links to a WAN can be selectively activated or disabled to provision bandwidth, for example, on demand, to react to changing conditions in the subnetworks.

29 Claims, 7 Drawing Sheets (52) U.S. Cl.
CPC ............ *Y02B 90/246* (2013.01); *Y04S 20/322* (2013.01); *Y04S 20/42* (2013.01)

(58) Field of Classification Search
USPC .............................. 370/386, 237; 340/870.02
See application file for complete search history.

(56) References Cited

U.S. PATENT DOCUMENTS

| | | |
|---|---|---|
| 2006/0056423 A1 | 3/2006 | Ratiu et al. |
| 2006/0106490 A1 | 5/2006 | Howell et al. |
| 2008/0025208 A1* | 1/2008 | Chan ....................... H04L 12/42 370/217 |
| 2008/0186202 A1 | 8/2008 | Vaswani et al. |
| 2009/0080333 A1* | 3/2009 | Ozer et al. .................... 370/237 |
| 2009/0267792 A1* | 10/2009 | Crichlow ................. 340/870.02 |
| 2010/0176933 A1 | 7/2010 | Barragan Trevino et al. |
| 2010/0191370 A1 | 7/2010 | Barragan Trevino et al. |
| 2012/0030353 A1* | 2/2012 | Balogh ......................... 709/224 |

OTHER PUBLICATIONS

Written Opinion (PCT/ISA/237) issued on Dec. 6, 2010, by European Patent Office as the International Searching Authority for International Application No. PCT/ US2009/005152.

English translation of Office Action from the Taiwan Intellectual Property Office (TIPO) dated Dec. 7, 2012, issued in corresponding Taiwanese Patent Application No. 098131179.

* cited by examiner

MESHED NETWORKING OF ACCESS POINTS IN A UTILITY NETWORK

CROSS-REFERENCE TO RELATED APPLICATIONS

This disclosure claims priority from U.S. Provisional Patent Application Ser. No. 61/098,948, filed Sep. 22, 2008, the content of which is hereby incorporated by reference in its entirety.

BACKGROUND

Field

The disclosed subject matter is generally directed to Advanced Metering Infrastructure (AMI), via which data is communicated between, e.g., a utility, such as an electric power company, and e.g., meters that are located at the premises of the customers of the utility. The exemplary embodiments are particularly aimed at efficient and economical communications between the meters and the utility servers via utility wireless network gateways (access points).

Description of Related Art

Figure 1:
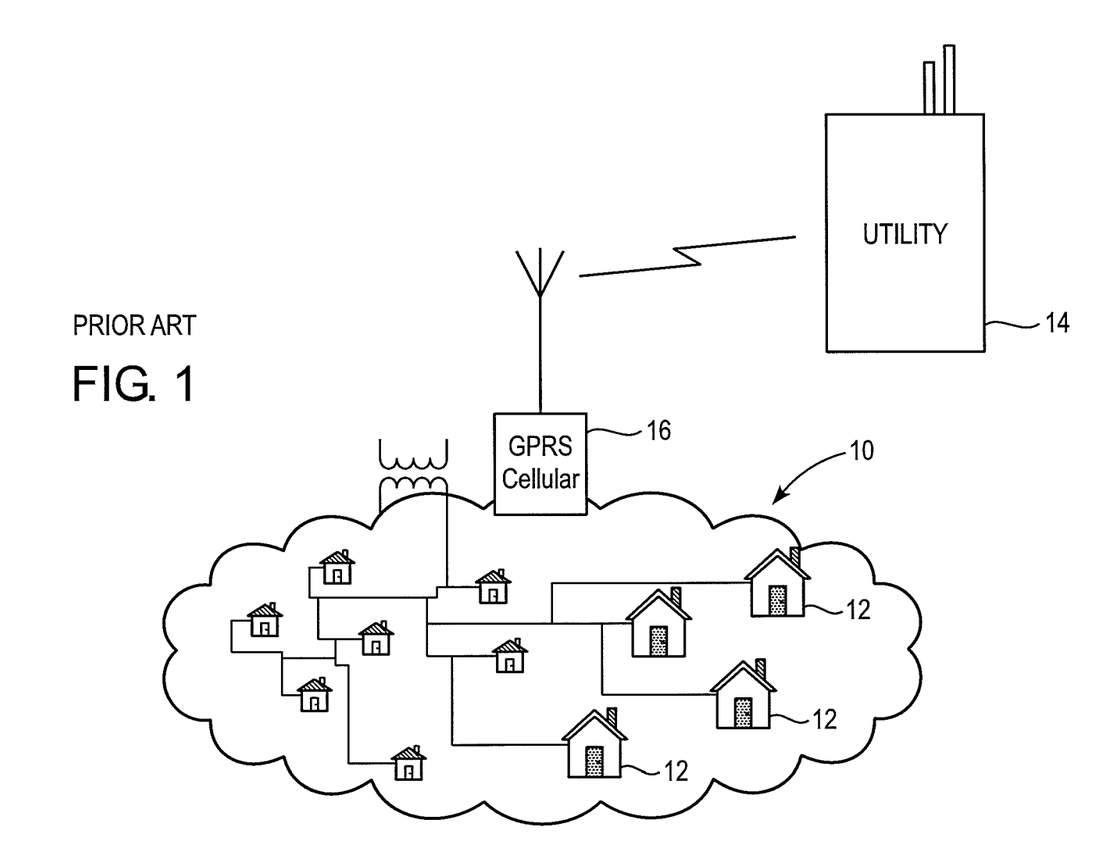
FIG. 1 is a schematic representation of a known metering subnetwork in a utility communications network that employs power line carrier as the data medium.

FIG. 1 shows an example of a subnetwork 10 in a known AMI system. In this example, each house 12 represents the location of, e.g., a meter that measures a customer's consumption of a commodity, such as electric power, provided by a utility 14. In addition to the amount of power being consumed, the meter may provide other pertinent data, such as peak consumption for the premises, average consumption for each hour, power outage conditions, tampering indications, etc.

All of the meters in a given geographic area may constitute end-points that are connected in a subnetwork having an access point (AP) 16 that provides for egress of the meter data out to the utility, and for ingress of utility commands to the end-point nodes. In one embodiment, the meters may communicate their respective data to the access point by way of power line carrier (PLC), in which the data is transmitted via the same conductors that deliver the electric power to the customers' premises. In such an embodiment, the access point can function as an aggregator. The access point can include a suitable interface to a backhaul link for transmitting the data received from the subnetwork's meters to the utility. In a known implementation, this backhaul link comprises a cellular modem that communicates with the utility by way of a suitable mobile data service, such as GPRS or CDMA/EVDO.

In another example, European Patent Pub. No. EP 1 677 270 A1 discloses a system where meters can transmit data to a gathering unit via a mix of low power radio or BLUETOOTH, PLC or mobile communications technology, e.g., cellular modems. The gathering unit can then subsequently send data to a concentrator via PLC.

Figure 2:
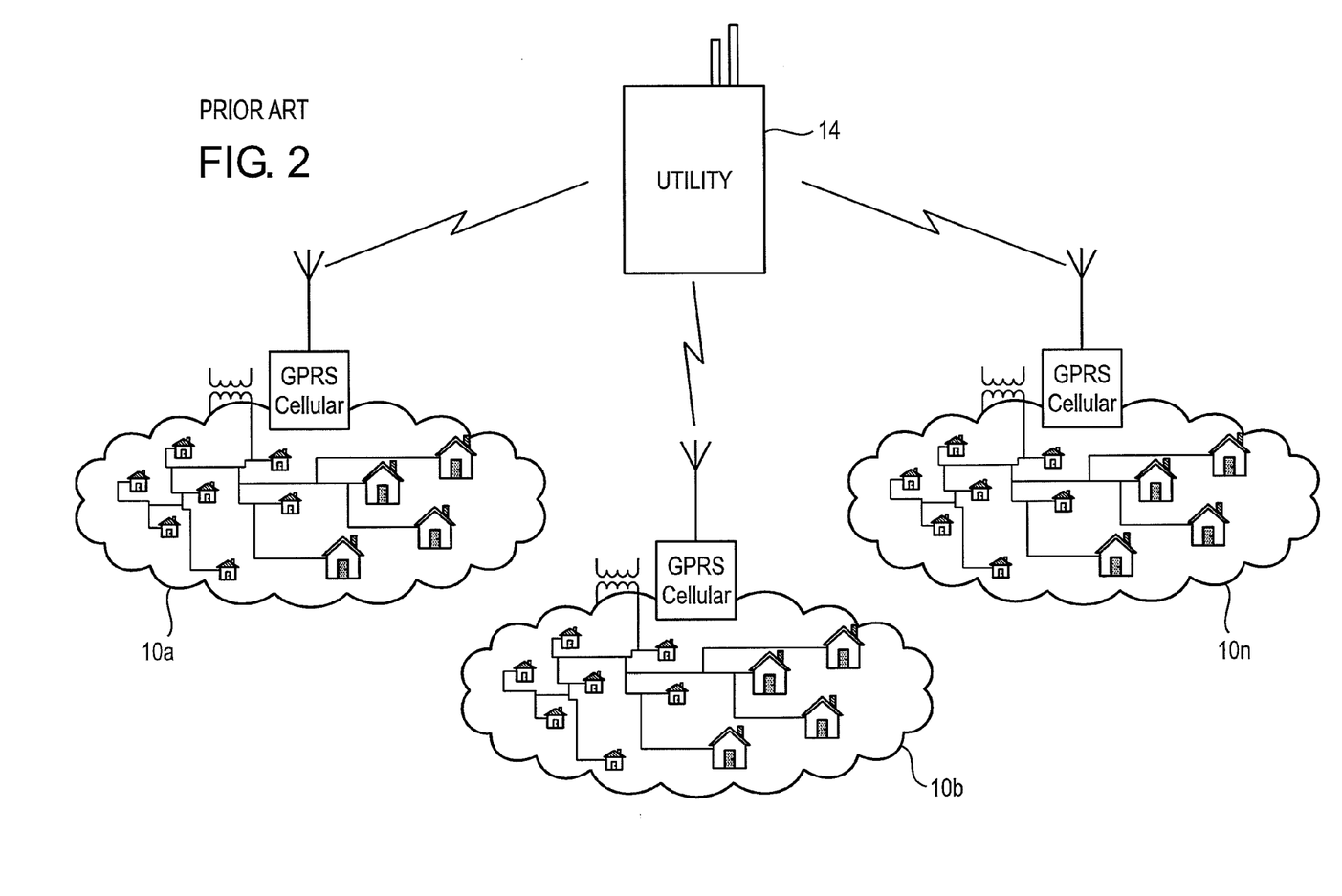
FIG. 2 is a schematic representation of a known utility communications network comprised of multiple subnetworks of the type shown in FIG. 1.

An electric power distribution system of the utility might have a large number of such subnetworks associated with it. Each of the subnetworks within the AMI may operate in a similar manner. FIG. 2 illustrates an exemplary communication system, in which each of the subnetworks 10a, 10b . . . 10n includes one or more access points that function to receive the data from each of the meters in the subnetwork, and communicate directly with the utility to forward that data. Deploying and operating a communications network of this type can result in a significant expense. First, the cellular modems themselves can be costly, and therefore the need to deploy thousands or tens of thousands of such modems for the individual subnetworks can result in a significant capital expenditure. Furthermore, the operational expenditures associated with such a large number of modems, both in terms of the operation of the modems themselves and the need to manage communications with a large number of modems at the central utility site, can be appreciable.

SUMMARY

The disclosed subject matter can provide a more efficient and cost effective arrangement for communicating data between the meters and the utility by linking the access points of multiple subnetworks for purposes of communicating with the utility. As a result, each individual subnetwork is not required to communicate with the utility directly. For those access points that are relieved of the need to directly communicate with the utility, the backhaul communication mechanism, e.g., cellular modem, can be eliminated, or deactivated, to thereby reduce capital expenditures and/or operational costs.

Additionally, links to a WAN can be selectively activated or disabled to provision bandwidth, for example, on demand, to react to changing traffic conditions in the subnetworks.

The utility network may include a plurality of subnetworks, each subnetwork comprising one or more measuring nodes, e.g., meters, and one or more access points configured to communicate with the measuring nodes. The subnetworks may be configured to collect or send data representative of or controlling consumption of a commodity or its usage at their associated measuring nodes from their respective access points. The subnetworks may be configured to communicate with a node external to the subnetworks, e.g., a utility server.

The access point of one of the subnetworks may be designated for communication with the node external to the subnetworks. An access point network interface associated with each of the access points of the subnetworks may be configured to communicate with access points of other subnetworks.

A backhaul network interface may be associated with a designated access point of one of the subnetworks. The backhaul network interface may be configured to communicate with the node external to the subnetworks. The access points of the subnetworks may be configured to forward data to the designated access point to be relayed to the node external to the subnetworks.

In another embodiment, a plurality of backhaul network interfaces can each be associated with an access point of the subnetworks. Each backhaul network interface may be configured to be selectively activated or disabled to relay collected data from the subnetworks to the node external to the subnetworks. The access points of the subnetworks may be configured to forward data to an activated backhaul network interface to be relayed to the node external to the subnetworks.

An exemplary method using the disclosed embodiments may include establishing a plurality of subnetworks, each subnetwork comprising one or more measuring nodes. An access point communicates with the one or more measuring nodes. The subnetworks may be configured to collect or send data representative of or controlling consumption of a commodity or its usage at their associated measuring nodes from their respective access points.

The method may further include associating an access point network interface with each of the access points of the subnetworks. Each access point network interface may be configured to communicate with access points of other subnetworks.

A backhaul network interface may be associated with a designated access point of one of the subnetworks. The backhaul network interface may be configured to communicate with a node external to the subnetworks. The access points of the subnetworks are configured to forward data to the designated access point to be relayed to the node external to the subnetworks.

In another exemplary method, a plurality of backhaul network interfaces may be provided, each backhaul network interface associated with an access point of the subnetworks, and each backhaul network interface configured to be selectively activated or disabled to relay collected data from the subnetworks to the node external to the subnetworks.

An exemplary access point may include a first interface configured to communicate with one or more measuring nodes comprising a subnetwork, a second interface configured to communicate with access points of other subnetworks and a third interface configured to communicate with a node external to the subnetworks. The third interface may be configured to be selectively activated or disabled to relay collected data from the subnetworks to a node external to the subnetworks. The access points of the other subnetworks may be configured to forward data to the access point comprising the first, second and activated third interfaces to be relayed to the node external to the subnetworks.

BRIEF DESCRIPTION OF THE DRAWINGS

As will be realized, different embodiments are possible, and the details disclosed herein are capable of modification in various respects, all without departing from the scope of the claims. Accordingly, the drawings and descriptions are to be regarded as illustrative in nature and not as restrictive. Like reference numerals have been used to designate like elements.

DETAILED DESCRIPTION

To facilitate an understanding of the principles upon which the disclosed subject matter is based, exemplary embodiments are described hereinafter with reference to their implementation in an electric power utility system. It will be appreciated that the practical applications of these principles are not limited to this particular type of system. Rather, the principles may be equally employed in any other type of utility, e.g., gas or water, where data pertaining to the consumption of a delivered resource is obtained at the site of consumption, such as a customer's premises, and communicated to a central location associated with the utility.

Figure 3:
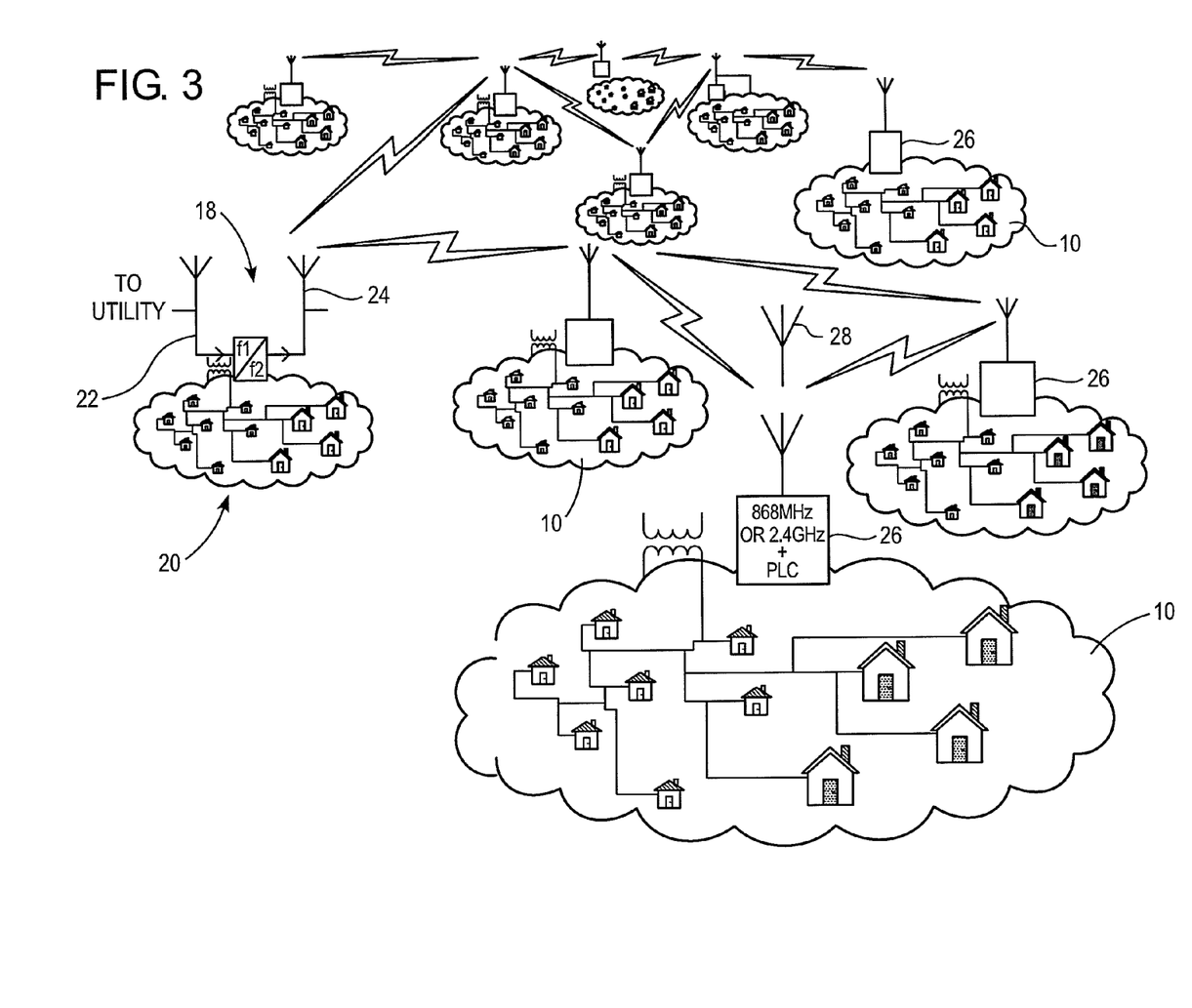
FIG. 3 is a schematic representation of a neighborhood of metering subnetworks that share a backhaul network interface for access to the utility.

An exemplary embodiment of a utility network that implements the principles underlying this disclosure is illustrated in FIG. 3. Each of a multiplicity of metering subnetworks 10 may have one or more access points at which data from the measuring nodes, e.g., meters, is collected and conveyed externally of the subnetwork, to be received at a node external to the subnetworks, e.g., the utility server.

Figure 4:
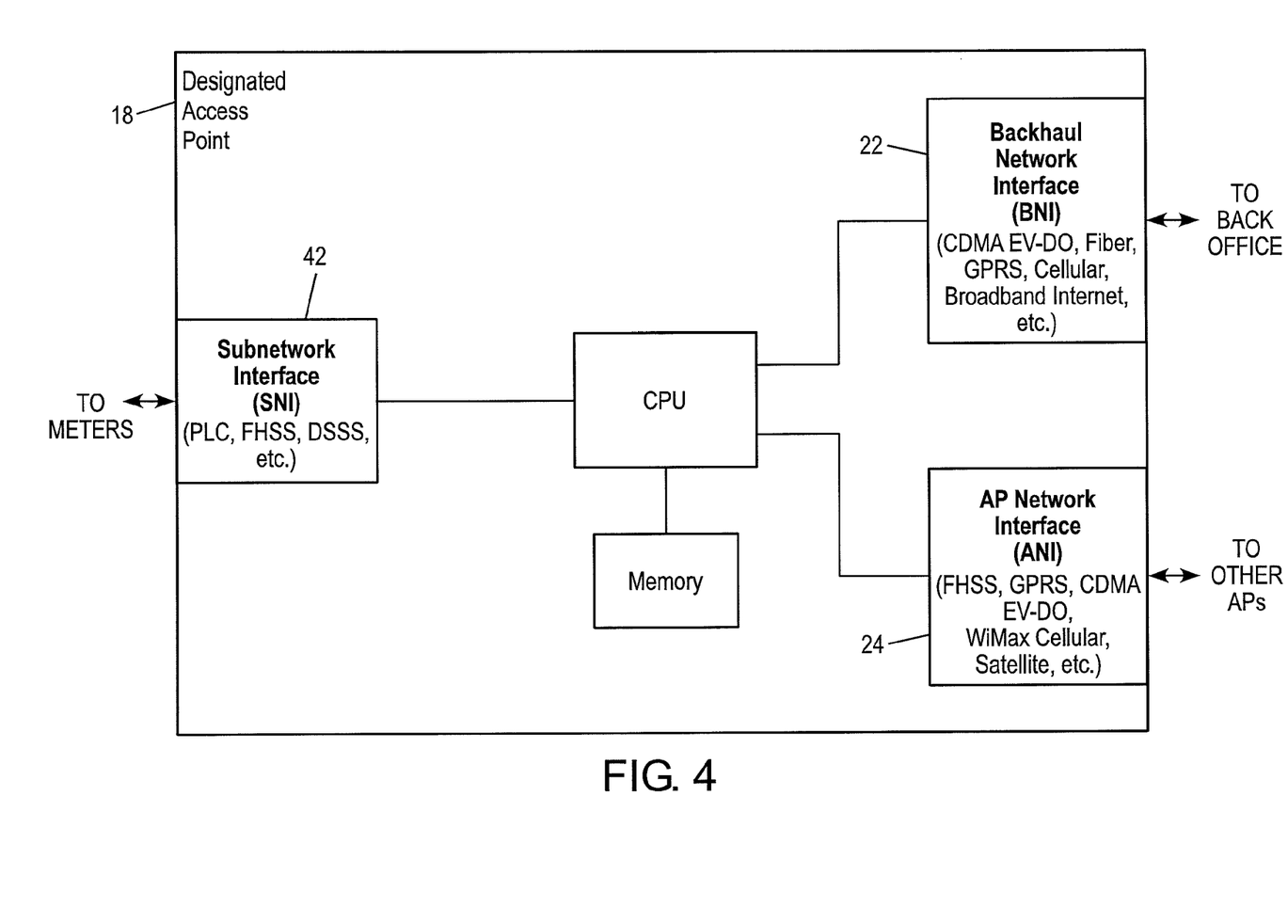
FIG. 4 is a block diagram of an exemplary access point.

Referring to FIGS. 3 and 4, the meters may communicate with the access points 18 and 26 via, for example, RF communications using a frequency-hopping spread spectrum protocol using what is referred to herein as a first interface or a subnetwork interface (SNI) 42, shown in FIG. 4, in the access points 18 and 26. In another embodiment, the meters may communicate via PLC using SNI 42, and the access point might be an aggregator. In the case where the meters of the subnetwork are associated with a particular electric power substation, the access point might be located at the site of the substation. In general, the access point may be located anywhere, but connected to the meters in the subnetwork.

A designated access point 18 and other access points 26 may also include a second interface, also referred to as an access point network interface (ANI) 24. ANI 24 may communicate with the access points of other subnetworks by way of an ad-hoc wireless network that links access points of multiple subnetworks. Each ANI 24 may be equipped with an RF transceiver (not shown). Each of these transceivers may communicate with other transceivers within radio range. In one example, frequency-hopping spread spectrum communications might be employed by the ANIs 24 of this ad-hoc wireless network. Other non-limiting examples of communications for use by an ANI include cellular, CDMA, EV-DO and WiMax.

The transceivers may contain, for example, software that enables them to cooperatively route, e.g. forward, data traffic for each other. Such forwarding may be managed by a central coordinator or may be created ad-hoc, when the transceivers establish local connectivity. With this arrangement, the subnetworks can collect the data from their associated meters at their respective access points and forward it on to the designated access point 18 of the subnetwork 20, either directly or via neighboring subnetworks, to be relayed to the utility via a third interface, also referred to as a backhaul network interface (BNI) 22.

A designated access point 18 for one of the subnetworks 20 can include a suitable BNI 22 for communicating with the utility 14. In an embodiment, BNI 22 may include a cellular modem (not shown). This mechanism may communicate with the utility via a wide area network (WAN). Other non-limiting communications mechanisms that may be used by the BNI include an RF transceiver, GPRS modem, a fiber optic link, an EV-DO link, a WiMAX link and a broadband Internet connection configured to communicate with the node external to the subnetworks.

The designated access point 18 for this subnetwork also functions to provide an interface between the WAN and a smart utility network (SUN) comprising multiple subnetworks in a given area. In the context of this disclosure, an ANI may be co-located with a BNI to create a designated access point to provide access to the WAN. In essence, the designated access point 18 functions as an ingress/egress point for the ad-hoc wireless network of access points. In an embodiment, the access points of the subnetworks may be configured to forward data to the designated access point to be relayed to the node external to the subnetworks, e.g., a back office server at utility 14.

A designated access point 18 may include a controller comprising suitable processing and storage devices to facilitate the communication of data between and among the SNI, BNI and ANI.

By way of the arrangement described above, only one cellular modem 22, WAN connection, or similar such communications mechanism, may be required to enable all of the subnetworks in the neighborhood to communicate with the utility server. The access points for the subnetworks in a geographic area, e.g., a neighborhood, other than the one that functions as a designated access point, only need to be equipped with a less costly, low-power RF transceiver, for example.

Alternatively, additional access points of subnetworks in the neighborhood may be provided with the combination of WAN connectivity and an RF transceiver to enable some or all of them to function as designated nodes for backhaul connectivity. In this case, the WAN connections, e.g., cellular modems, in the access points of the individual subnetworks can be selectively disabled or activated as needed to provide a limited number of communication links between the subnetworks of the neighborhood and the utility server. In an embodiment, a plurality of BNIs can each be associated with a respective access point of the subnetworks, and each BNI may be configured to be selectively activated or disabled to relay collected data from the subnetworks to the node external to the subnetworks. The access points of the subnetworks may be configured to forward data to an activated BNI to be relayed to the node external to the subnetworks.

The plurality of BNIs may be configured to provide a subnetwork with multiple paths to relay collected data from the subnetwork to the node external to the subnetworks. In addition, different ones of the plurality of BNIs may relay data to the external node via different communications media and different communications protocols.

By limiting the total number of communication links that are functioning at any given time, the overall operational expenditures associated with the exemplary AMI system may be reduced. Multiple designated access points can also facilitate multi-homing capabilities for the communications network, enabling each subnetwork in the neighborhood to reach the utility via two or more distinct paths.

The ability to selectively deactivate the links to the WAN can be effectively employed during the deployment of an AMI network. At the outset, the subnetworks may be sparsely deployed, as a result of which the access points of individual subnetworks may not be able to communicate with those of any other subnetworks. As gaps in the network are filled with additional subnetworks, the distances between the access points of the subnetworks may become short enough that communication between them, via the access points 26, is reliable. At this point, the subnetworks can begin to form a mesh network and the BNIs in various ones of the communicating networks can be deactivated. As the coverage of the subnetworks becomes denser, additional BNIs can be deactivated to further reduce the cost of communications to the utility. Alternatively, if the traffic density at subnetwork level increases significantly, more than one BNI may be activated to lighten the load at a single BNI.

Additionally, links to the WAN can be selectively activated or disabled to provision bandwidth, for example, on demand, to react to changing traffic conditions in the subnetworks.

Figure 5:
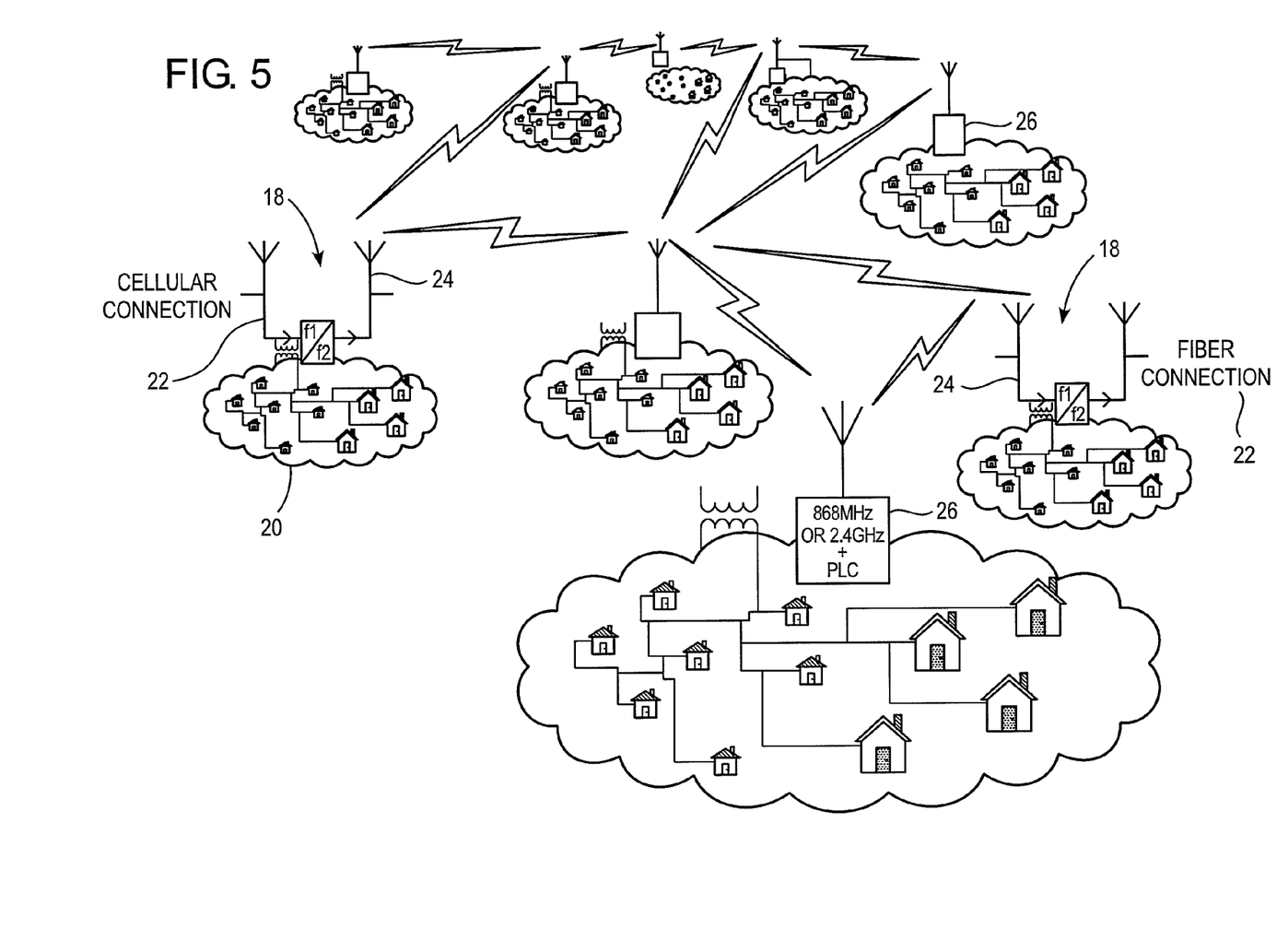
FIG. 5 is a schematic representation of a variation of the neighboring subnetworks that provides multi-homing capabilities.

As mentioned above, a cellular modem may be employed as the mechanism for providing the communication link with the utility server via the WAN. However, any other suitable medium may be employed for this purpose. For example, as depicted in FIG. 5, the BNI of one subnetwork might be connected to the WAN via a GPRS modem, whereas the BNI for another subnetwork in the neighborhood might be connected via a fiber optic link. Either one of these BNIs can be selectively employed to communicate with the utility, based upon suitable criteria. Examples of such criteria may include signal strength, available bandwidth, cost of service, traffic load through the access point, reliability, latency, etc.

In an embodiment, the ANIs associated with the access points of each subnetwork and any intermediate relays may form an ANI network. In such an ANI network, the ANIs may be configured to communicate using, for example, frequency hopping spread spectrum (FHSS), GPRS, CDMA EV-DO, WiMax, cellular or satellite communications.

The decision as to which one of the BNIs to employ at any given time may be made at a centralized location, e.g., the utility itself. In this case, the central decision point may selectively activate and deactivate the BNIs to perform load balancing, and/or direct traffic to obtain a cost reduction.

Alternatively, a decentralized decision-making process may be employed, in which the access points decide amongst themselves which one to employ with an activated BNI to the WAN, through the exchange of information with one another via their RF links. The activate/deactivate decision may be based upon metrics that pertain to various criteria, which may be measured at the respective access points. This decentralized approach enables the nodes to react quickly to traffic patterns and possible transient situations.

Indeed, a mix of centralized and decentralized decision-making may also be employed to integrate knowledge that may only be available to back office systems at the utility with knowledge that may only be available among the access points.

The multi-homing capability of this arrangement can also provide a failure-resistant redundancy that adds robustness to the network. For example, if the cellular service experiences a failure, the subnetworks of the neighborhood can switch to another BNI that employs a different medium, such as the fiber-optic link, to maintain communication with the utility.

The capability to utilize different media for connection over a WAN to the utility can also provide a significant ability to accommodate post-deployment changes in a cost-effective manner. For example, the GPRS data service may become obsolescent, requiring a switch to a newer generation that is supported by a local communications provider, e.g. CDMA/EV-DO or WiMAX. Rather than necessitating a replacement or upgrade of every access point in the neighborhood to provide the necessary functionality required by the new medium, only a few of the designated access points that include a BNI need to undergo such a change.

Other variations of connectivity to the utility via the WAN are also possible. For instance, a connection to the WAN, i.e., BNI, might be located within the home of one of the customers in the subnetwork, e.g. a broadband Internet connection. In this case, the meter at that home can function as the BNI, and provide data received from other meters in the subnetwork to the utility via the broadband connection.

In the example illustrated in FIG. 3, the access points of the subnetworks of the neighborhood may communicate directly with one another. In some cases, for example in rural areas, the subnetworks may be geographically dispersed out of range of many transceivers. Likewise, other geographic or topographical constraints may interfere with the ability of the access points of adjacent subnetworks to communicate directly, e.g. tall, densely packed buildings. In such cases, relay transceivers 28 may be deployed as appropriate to compensate for possible gaps in the communication paths, and/or to add robustness. For example, if the utility detects that two subnetworks are individually communicating with it and determines that they are geographically close to one another, it may deploy a relay 28 at a location that is accessible to both of them, so that only one of them needs to exchange data directly with the utility.

Figure 6:
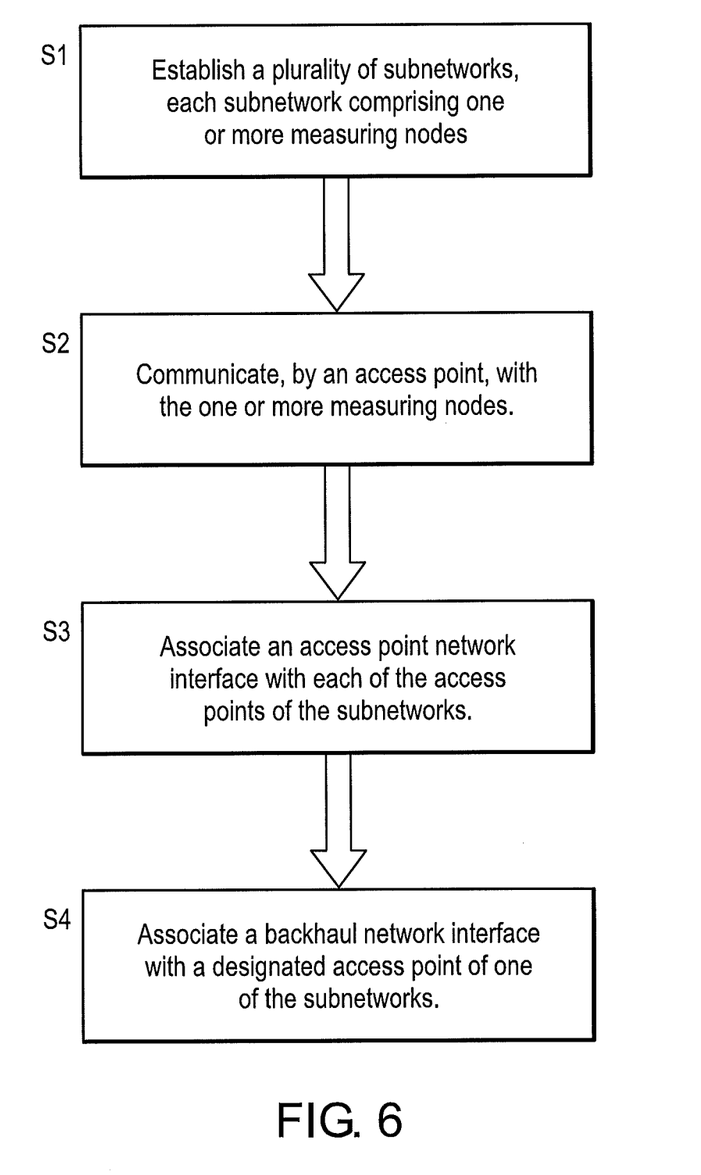
FIG. 6 is a flow diagram according to an exemplary embodiment.

FIG. 6 shows an exemplary method using the disclosed embodiments. The method may include a step S1 of establishing a plurality of subnetworks, each subnetwork comprising one or more measuring nodes. At S2, an access point communicates with the one or more measuring nodes using, e.g., an SNI. The subnetworks may be configured to collect or send data representative of or controlling consumption of a commodity or its usage at their associated measuring nodes from their respective access points.

The method may further include the step S3 of associating an ANI with each of the access points of the subnetworks. Each ANI may be configured to communicate with access points of other subnetworks.

The method includes step S4 of associating a BNI with a designated access point of one of the subnetworks. The BNI may be configured to communicate with a node external to the subnetworks. The access points of the subnetworks may be configured to forward data to the designated access point to be relayed to the node external to the subnetworks.

Figure 7:
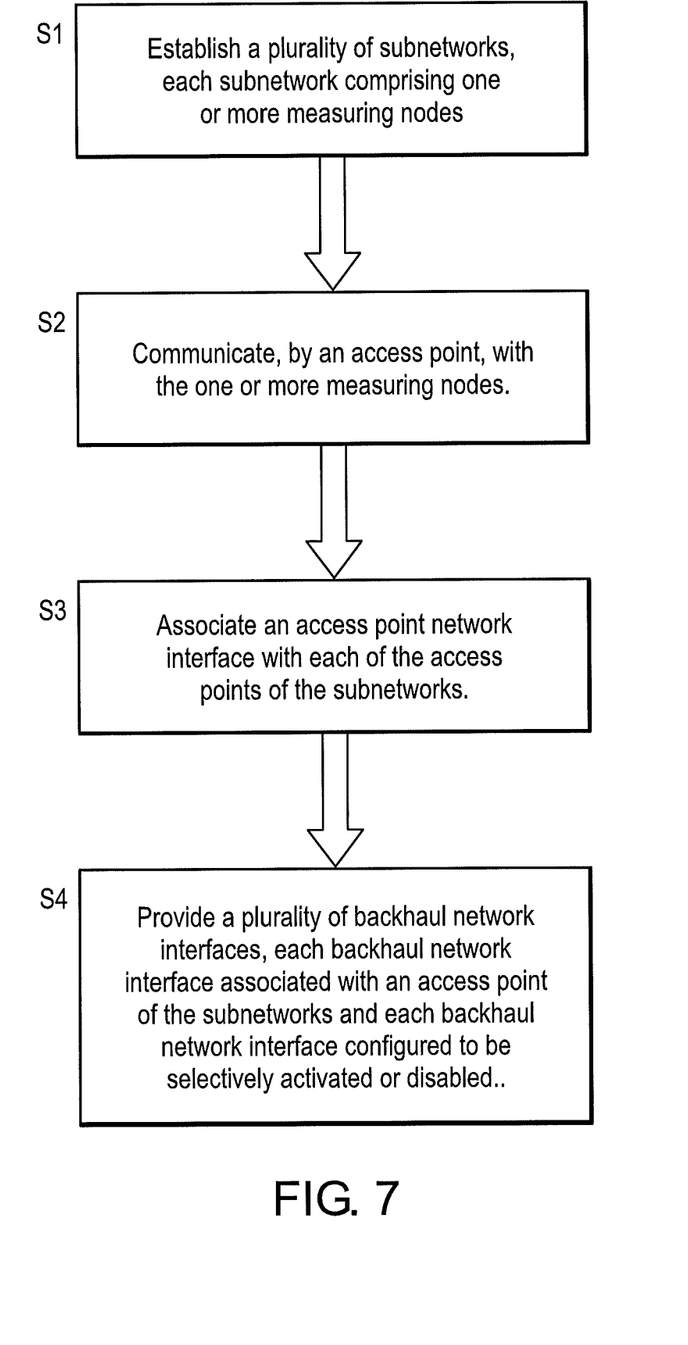
FIG. 7 is a flow diagram according to another exemplary embodiment.

FIG. 7 shows another exemplary method in which at step S4, a plurality of BNIs may be provided, each BNI associated with a respective access point of the subnetworks, and each BNI configured to be selectively activated or disabled to relay collected data from the subnetworks to the node external to the subnetworks.

From the foregoing, it may be seen that linking the access points of multiple meter subnetworks into a mesh network provides more efficient and cost effective communications with the utility. A limited number of designated access points may communicate directly with the utility at any given time. As a result, network robustness and reliability can be enhanced simultaneously with a reduction in capital expenditures and/or operational costs.

The above description is presented to enable a person skilled in the art to make and use the systems and methods described herein, and is provided in the context of a particular application and its requirements. Various modifications to the embodiments will be readily apparent to those skilled in the art, and the generic principles defined herein may be applied to other embodiments and applications without departing from the spirit and scope of the claims. Thus, there is no intention to be limited to the embodiments shown, but rather to be accorded the widest scope consistent with the principles and features disclosed herein.

What is claimed is:

1. A method of communicating in a network, comprising:
   establishing a plurality of subnetworks, each subnetwork comprising one or more nodes and at least one access point;
   communicating, by an access point of each subnetwork, with the one or more nodes of that subnetwork, wherein the subnetworks are configured to send and receive data to and from their associated nodes via their respective access points;
   providing a first backhaul network interface that implements a first communications technology in a first access point of at least one of the plurality of subnetworks, said backhaul network interface being configured to communicate with a node external to the subnetworks;
   associating a respective access point network interface with access points of the subnetworks, each access point network interface being configured to communicate with access points of other subnetworks, and to communicate with the external node via an access point having a backhaul network interface;
   transmitting data between any given subnetwork and the external node via an access point having a backhaul network interface that implements the first communications technology;
   providing a second backhaul network interface that implements a second communications technology, different from the first communications technology, in a second access point of at least one of the plurality of subnetworks;
   switching the transmission of data between subnetworks and the external node from a backhaul network interface that implements the first communications technology to a backhaul network interface that implements the second communications technology; and
   selectively disabling communication with the external node in one or more backhaul network interfaces to limit a number of access points communicating with the external node to a limited number, wherein
   the first access point and the second access point are different access points, and
   each access point is further configured to maintain communication with access points of other subnetworks via the access point network interface during the switching of the transmission of data from the backhaul network interface that implements the first communications technology to the backhaul network interface that implements the second communications technology.

2. The method of claim 1, wherein the backhaul network interface that implements the second communications technology is provided in at least one, but less than all, of the access points for the plurality of subnetworks.

3. The method of claim 1, wherein the access points communicate with one another via a frequency-hopping spread spectrum network.

4. The method of claim 1, wherein at least some of the nodes are measuring nodes configured to collect data representative of or controlling consumption of a commodity or its usage at the location of the measuring node, and wherein the commodity is at least one of electricity, gas and water.

5. The method of claim 4, wherein the node external to the subnetworks is a utility server.

6. The method of claim 4, wherein the measuring nodes of a subnetwork are configured to communicate with the access point using at least one of power line carrier and radio frequency communication.

7. The method of claim 1, wherein at least one of the backhaul network interfaces comprises a cellular modem, a GPRS modem, a fiber optic link, an EV-DO link, a WiMAX link or a broadband Internet connection configured to communicate with the node external to the subnetworks.

8. The method of claim 1, wherein the access point network interface associated with each access point of the subnetworks comprises a radio transceiver that communicates with access points of other subnetworks.

9. The method of claim 8 wherein the access point network interface transceiver comprises a modem which is one of frequency hopping spread spectrum, cellular, CDMA EV-DO and WiMax.

10. The method of claim 1, wherein the first and second backhaul network interfaces are configured to provide a subnetwork with multiple paths to relay data between the subnetwork and the node external to the subnetworks.

11. The method of claim 1, wherein said first and second backhaul network interfaces relay data to the external node via different respective communication media.

12. The method of claim 1, wherein said first and second backhaul network interfaces relay data to the external node via different respective communication protocols.

13. The method of claim 1, wherein the switching is performed at a central location associated with the node external to the subnetworks.

14. The method of claim 1, wherein the switching is performed in at least one of the access points.

15. A network, comprising:
a plurality of subnetworks, each subnetwork comprising:
one or more nodes,
an access point configured to communicate with the one or more nodes,
wherein the subnetworks are configured to send and receive data to and from their associated nodes via their respective access points, and
access point network interfaces respectively associated with access points of the subnetworks, each access point network interface configured to communicate with access points of other subnetworks;
a node external to the subnetworks;
a plurality of backhaul network interfaces, including a first backhaul network interface that implements a first communications technology, and that is associated with a first access point, and a second backhaul network interface that implements a second communications technology, different from the first communications technology, associated with a second access point, each backhaul network interface configured to communicate with the external node via its respective communications technology, and wherein the access points are configured to communicate with the external node via an access point having a backhaul network interface; and
a controller for
selecting one of the first and second access points as the access point to relay data between other access points and the external node, and
selectively disabling communication with the external node in one or more backhaul network interfaces to limit a number of access points communicating with the external node to a limited number,
wherein the access points of the subnetworks are configured to forward data to the selected access point, to be relayed to the node external to the subnetworks, and
wherein the first access point and the second access point are different access points, and each access point is further configured to maintain communication with access points of other subnetworks via the access point network interface during the switching of the transmission of data from the backhaul network interface that implements the first communications technology to the backhaul network interface that implements the second communications technology.

16. The network of claim 15, wherein the backhaul network interface that implements the second communications technology is provided in at least one, but less than all, of the access points for the plurality of subnetworks.

17. The network of claim 15, wherein the access points communicate with one another via a frequency-hopping spread spectrum network.

18. The network of claim 15, wherein at least some of the nodes are measuring nodes configured to collect data representative of or controlling consumption of a commodity or its usage at the location of the measuring node, and wherein the commodity is at least one of electricity, gas and water.

19. The network of claim 18, wherein the node external to the subnetworks is a utility server.

20. The network of claim 18, wherein the measuring nodes of a subnetwork are configured to communicate with the access point using at least one of power line carrier and radio frequency communication.

21. The network of claim 15, wherein at least one of the backhaul network interfaces comprises a cellular modem, a GPRS modem, a fiber optic link, an EV-DO link, a WiMAX link or a broadband Internet connection configured to communicate with the node external to the subnetworks.

22. The network of claim 15, wherein the access point network interface associated with each of the access points of the subnetworks comprises a radio transceiver that communicates with access points of other subnetworks.

23. The network of claim 22 wherein the access point network interface transceiver comprises a modem which is one of frequency hopping spread spectrum, cellular, CDMA, EV-DO and WiMax.

24. The access point network of claim 15, wherein the access point network interfaces are configured to communicate using at least one of frequency hopping spread spectrum, GPRS, CDMA, EV-DO and WiMax.

25. The network of claim 15, wherein the plurality of backhaul network interfaces are configured to provide a subnetwork with multiple paths to relay data from the subnetwork to the node external to the subnetworks.

26. The network of claim 15, wherein said first and second backhaul network interfaces relay data to the external node via different respective communication media.

27. The network of claim 15, wherein said first and second backhaul network interfaces relay data to the external node via different respective communication protocols.

28. The network of claim 15, wherein the controller is located at a central location associated with the node external to the subnetworks.

29. The network of claim 15, wherein the controller is located in at least one of the access points.

* * * * *